(12) United States Patent
Iwabuchi

(10) Patent No.: US 11,652,954 B2
(45) Date of Patent: May 16, 2023

(54) INFORMATION PROCESSING APPARATUS, SYSTEM, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Kiyoshi Iwabuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/467,048

(22) Filed: Sep. 3, 2021

(65) Prior Publication Data
US 2022/0078357 A1 Mar. 10, 2022

(30) Foreign Application Priority Data

Sep. 9, 2020 (JP) .............................. JP2020-151169

(51) Int. Cl.
| | |
|---|---|
| H04N 5/268 | (2006.01) |
| H04N 23/661 | (2023.01) |
| H04N 23/69 | (2023.01) |
| H04N 23/695 | (2023.01) |
| H04N 7/18 | (2006.01) |
| H04N 23/62 | (2023.01) |
| H04N 23/63 | (2023.01) |
| H04N 23/66 | (2023.01) |

(52) U.S. Cl.
CPC ........... *H04N 5/268* (2013.01); *H04N 23/661* (2023.01); *H04N 23/69* (2023.01); *H04N 23/695* (2023.01)

(58) Field of Classification Search
CPC ............... H04N 5/268; H04N 5/23206; H04N 5/23296; H04N 5/23299; H04N 5/23203; H04N 5/23216; H04N 5/232941; H04N 7/181
See application file for complete search history.

(56) References Cited

U.S. PATENT DOCUMENTS

| | | | |
|---|---|---|---|
| 2016/0248989 A1* | 8/2016 | Cross | ................. H04N 21/2385 |
| 2018/0063398 A1* | 3/2018 | Tajiri | .................... H04N 5/232 |

FOREIGN PATENT DOCUMENTS

JP 2018033006 A 3/2018

* cited by examiner

*Primary Examiner* — Christopher K Peterson
(74) *Attorney, Agent, or Firm* — Canon U.S.A., Inc. IP Division

(57) ABSTRACT

A video distribution apparatus (corresponding to an information processing apparatus) is provided with a light emitting diode (LED) (a tally lamp) for indicating whether a video is selected as a video being distributed or a video in a standby state by a switcher, which receives the video. In a case where a control command is received from an infrared remote controller (corresponding to an external device), the video distribution apparatus determines whether the LED (the tally lamp) is in an ON state or an OFF state. In a case of the ON state, the video distribution apparatus disables a control command from the infrared remote controller. In a case of the OFF state, the video distribution apparatus performs processing according to the control command from the infrared remote controller.

14 Claims, 10 Drawing Sheets

FIG.9

| IP ADDRESS | TYPE |
|---|---|
| 192.168.0.10 | SWITCHER |
| 192.168.0.20 | WI-FI REMOTE CONTROLLER |
| | |

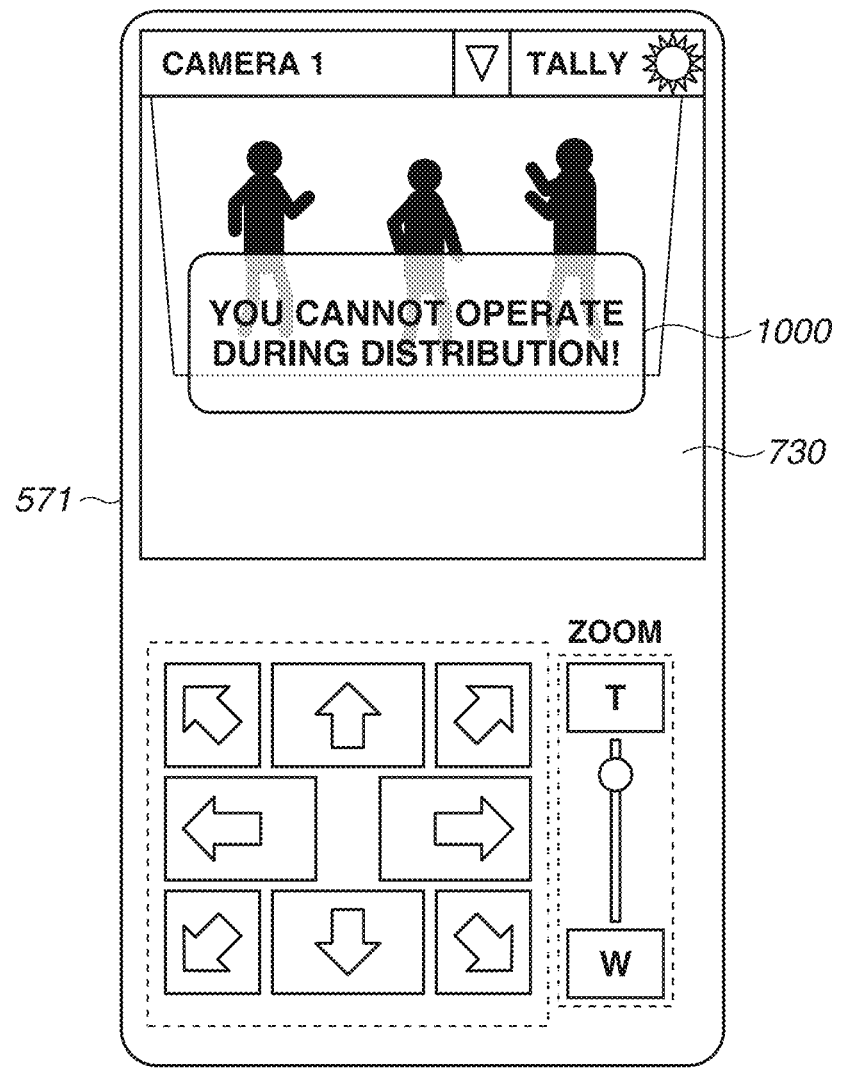

INFORMATION PROCESSING APPARATUS, SYSTEM, METHOD FOR CONTROLLING INFORMATION PROCESSING APPARATUS, AND STORAGE MEDIUM

BACKGROUND

Field of the Disclosure

The present disclosure relates to an information processing apparatus that can be controlled from an external device, a system, a method for controlling the information processing apparatus, and a storage medium.

Description of the Related Art

In recent years, there have been distribution systems which distribute videos from a plurality of fixed cameras while switching them by a switcher. Moreover, there has been a technique for preventing a plurality of remote controllers from performing control at the same time in a case where the remote controllers control a change of an imaging angle of view of a camera and the like. Japanese Patent Application Laid-Open No. 2018-33006 discusses a technique for performing exclusion control on an operation signal issued from other interfaces during a period from reception of an operation signal to an end of an operation by a device or a period in which all the operations corresponding to a series of operation signals are completed.

According to the above-described distribution system, in a case where video distribution is performed while the videos from the plurality of fixed cameras are being switched, it is difficult for a single user to switch the videos and change the imaging angle of view of the camera in some cases. Thus, an operation is contemplated in which a person in charge different from the user in charge of controlling the switcher for switching the videos from the cameras controls the change of the imaging angle of view of the camera and the like with the remote controller. The technique discussed in Japanese Patent Application Laid-Open No. 2018-33006 enables exclusion of camera control performed by the plurality of remote controllers, but does not consider whether the video of the camera to be controlled is being distributed by the switcher. Thus, in a case where the person in charge different from the person in charge of the switcher controls the camera that is distributing a video by the remote controller with an erroneous operation or the like, there is a possibility that a video different from the intention of the person in charge of the switcher will be distributed.

SUMMARY

In order to prevent an unintended operation from occurring in a case where an external device controls an apparatus for video distribution, an information processing apparatus according to the present disclosure is an information processing apparatus for distributing a video captured by an image capturing unit. The information processing apparatus includes a reception unit configured to receive a control instruction from an external device, an acquisition unit configured to acquire state information regarding a distribution state of the video, and a control unit configured to perform control so as not to perform processing according to the control instruction received by the reception unit in a case where the state information acquired by the acquisition unit indicates a predetermined state.

Further features of the present disclosure will become apparent from the following description of exemplary embodiments with reference to the attached drawings.

BRIEF DESCRIPTION OF THE DRAWINGS

FIG. 9 illustrates an example of a control device information table.

FIG. 10 illustrates an example of display on a Wi-Fi remote controller.

DESCRIPTION OF THE EMBODIMENTS

Figure 1:
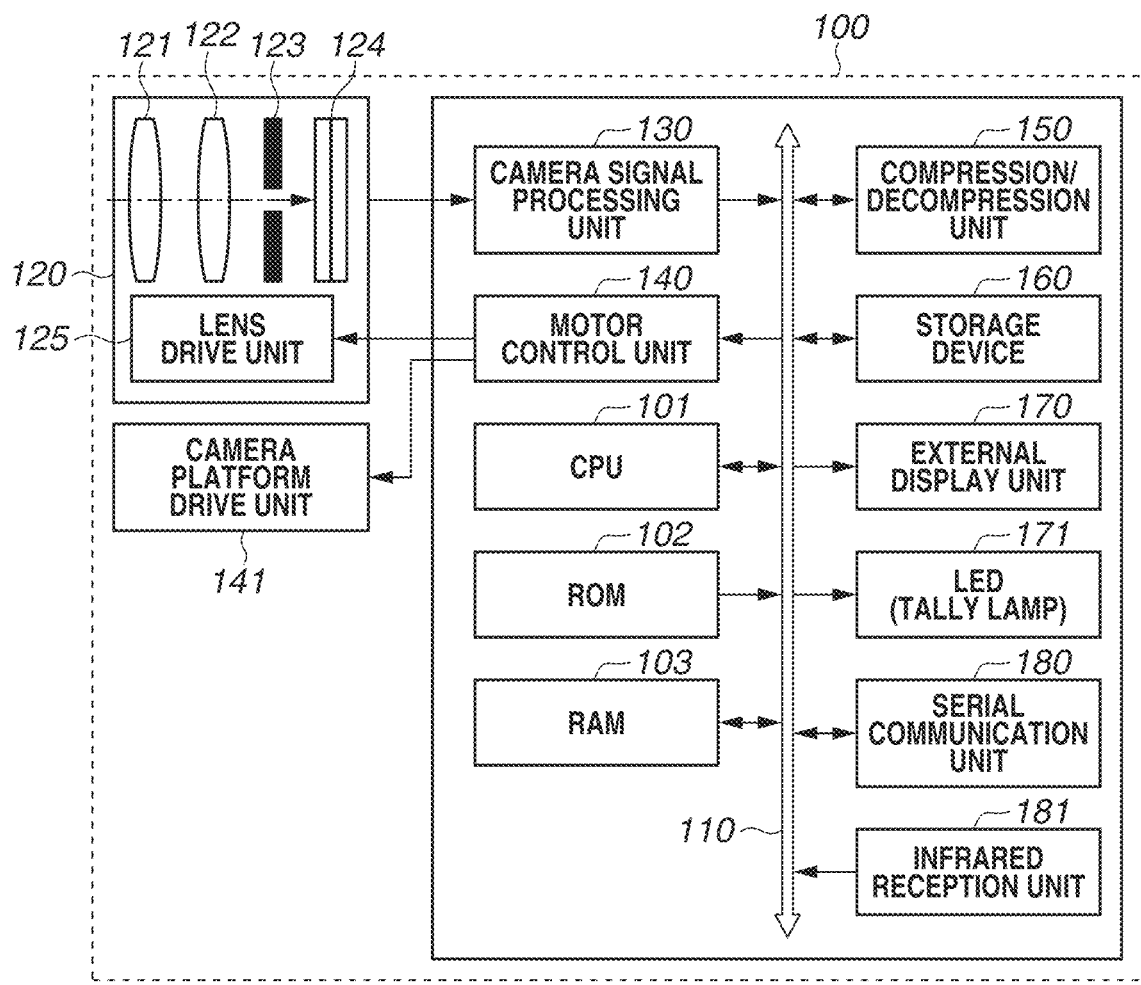
FIG. 1 illustrates an example of a configuration of a video distribution apparatus according to one or more aspects of the present disclosure.

A first exemplary embodiment of the present disclosure will be described below. A video distribution apparatus according to the present exemplary embodiment will be described below with reference to FIGS. 1 to 3. FIG. 1 is a schematic diagram illustrating a configuration of a video distribution apparatus 100 according to the first exemplary embodiment. The video distribution apparatus 100 is an example of an information processing apparatus. A central processing unit (CPU) 101 controls a video distribution apparatus 100 in entirety. A read-only memory (ROM) 102 is a nonvolatile memory, such as an electrically erasable and programmable read only memory (EEPROM) and a flash memory. A random access memory (RAM) 103 is a volatile memory, such as a static random access memory (SRAM) and a dynamic random access memory (DRAM). A program for realizing the functions according to the present exemplary embodiment and data used in execution of the program are stored in the ROM 102 and the like. These program and data are appropriately loaded into the RAM 103 via a bus 110 under control of the CPU 101 and executed by the CPU 101.

An image capturing unit 120 includes a zoom lens 121, a focus lens 122, an diaphragm 123, and an image capturing element 124 including an image sensor and the like. The zoom lens 121 is moved along an optical axis by a lens drive unit 125. Similarly, the focus lens 122 is moved along the optical axis by the lens drive unit 125. The diaphragm 123 is operated by being driven by the lens drive unit 125. The image capturing element 124 performs photoelectric conversion on light having passed through the zoom lens 121, the focus lens 122, and the diaphragm 123 to generate an analog image signal. The generated analog image signal is subjected to amplification processing based on sampling processing such as correlated double sampling and then input to a camera signal processing unit 130.

The camera signal processing unit 130 converts the analog image signal from the image capturing unit 120 into a digital image signal by analog-to-digital (A/D) conversion and then performs various types of digital image processing thereon. The various types of digital image processing includes, for example, offset processing, gamma correction processing, gain processing, red-green-blue (RGB) interpolation processing, noise reduction processing, contour correction processing, color tone correction processing, and light source type determination processing. The video having been subjected to the digital image processing is stored in the RAM 103 via the bus 110. A motor control unit 140 controls driving of the above-described lens drive unit 125 and a camera platform drive unit 141. The camera platform drive unit 141 is a motor mechanism that turns a camera platform on which the entire image capturing unit 120 is mounted in a pan direction and a tilt direction.

The video stored from the camera signal processing unit 130 in the RAM 103 is output as an external display signal to the outside via an external display unit 170, also subjected to compression processing by a compression/decompression unit 150, and stored in a storage device 160. As the external display signal according to the present exemplary embodiment, a serial digital interface (SDI) signal and a High-Definition Multimedia Interface (HDMI, registered trademark) signal are used, but the external display signal is not limited to them. The video output to the outside via the external display unit 170 is provided to an external apparatus (e.g., a switcher 281 in FIG. 2). Examples of the storage device 160 includes a hard disk drive (HDD), a solid state drive (SSD), and an embedded MultiMediaCard (eMMC).

A light emitting diode (LED) 171 is a tally lamp which indicates whether the video is selected as the video being distributed or the video in a standby state by the external apparatus (e.g., the switcher 281 in FIG. 2) that receives the video output to the outside. The tally lamp includes a plurality of lamps and is provided at a position which is easily perceived from an object side or a position which is easily visible from an operator who issues a control instruction to the video distribution apparatus 100 (e.g., such an operator is, for example, an operator 270 with a remote controller in FIG. 2, which is referred to as remote controller operator 270). A distribution state such as "during video distribution" or "in the standby state" can be distinguished by a plurality of colors such as red and green of the tally lamp. A serial communication unit 180 is an interface for communicating with the external apparatus (e.g., the switcher 281 in FIG. 2). If the serial communication unit 180 receives control information for issuing various control instructions to the video distribution apparatus 100, the CPU 101 performs various processing according to the control information. An infrared reception unit 181 receives a control command from an infrared remote controller (e.g., an infrared remote controller 271 in FIG. 2) with which various control instructions are issued to the video distribution apparatus 100. If the infrared reception unit 181 receives the control command from the video distribution apparatus 100, the CPU 101 controls the motor control unit 140 to change an imaging direction and/or a zoom factor and performs various operations such as changing an imaging condition according to the control command.

Figure 2:
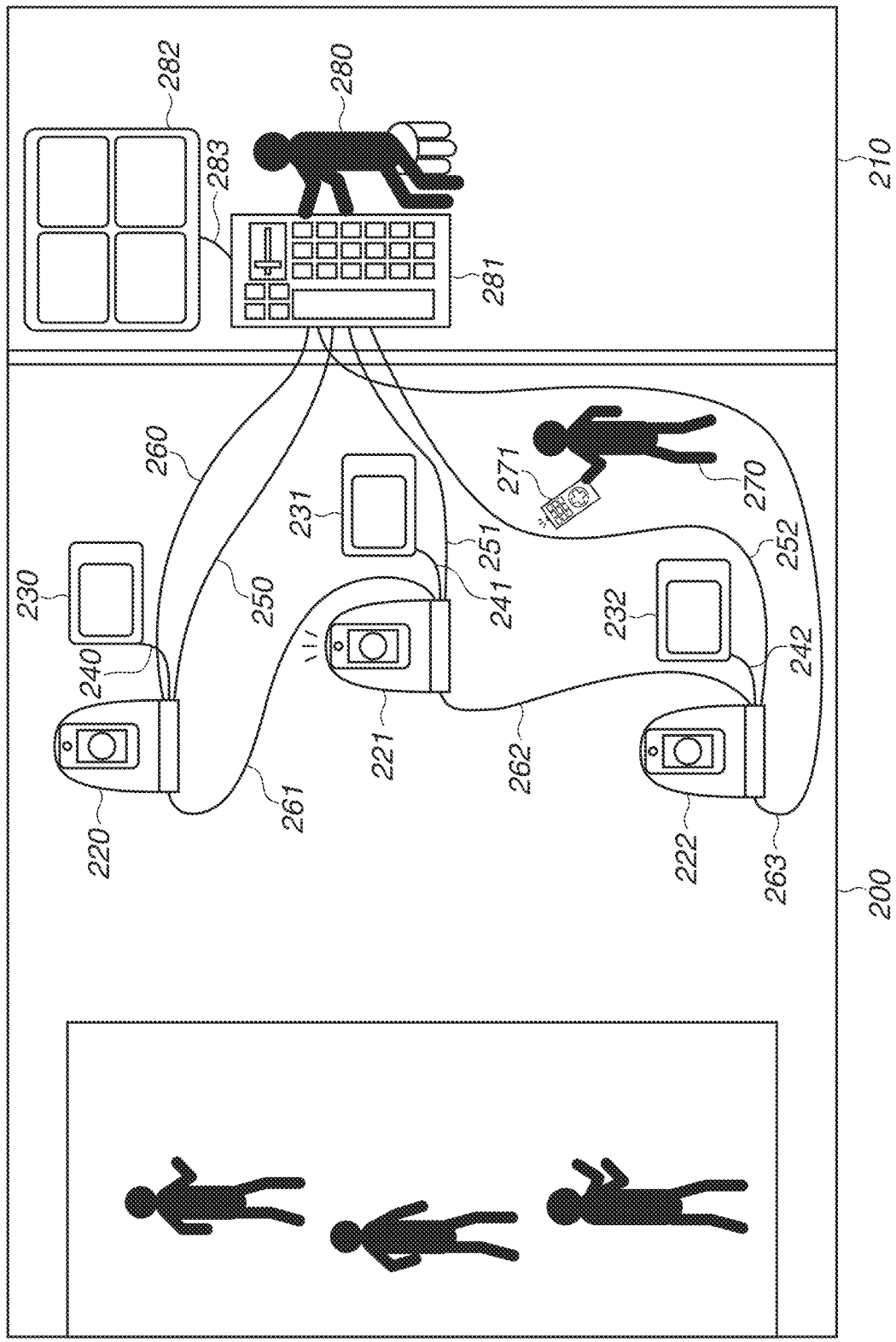
FIG. 2 illustrates an example of an entire configuration of a distribution system according to one or more aspects of the present disclosure.

FIG. 2 illustrates an example of the entire configuration of a distribution system including the video distribution apparatus 100 according to the present exemplary embodiment. The distribution system includes a studio 200 in which videos are captured and a sub control room 210 in which the switcher 281 is installed which is connected to pan-tilt-zoom (PTZ) cameras 220 to 222 fixed to predetermined positions in the studio 200. The video distribution apparatus 100 in FIG. 1 is built in each of the PTZ cameras 220 to 222. According to the present exemplary embodiment, videos from the three PTZ cameras 220 to 222 are provided to the switcher 281, but the number of the PTZ cameras which capture the videos to be provided to the switcher 281 is not limited to three.

Monitors 230 to 232 for checking the videos are set respectively near the PTZ cameras 220 to 222 and connected by HDMI (registered trademark) cables 240 to 242. The videos output from the external display units 170 of the PTZ cameras 220 to 222 are respectively displayed on the monitors 230 to 232 for checking the videos via the HDMI (registered trademark) cables 240 to 242. The PTZ cameras 220 to 222 are respectively connected to the switcher 281 by SDI cables 250 to 252. The videos output from the external display units 170 of the PTZ cameras 220 to 222 are respectively transmitted to the switcher 281 via the SDI cables 250 to 252. The switcher 281 receives the videos from the PTZ cameras 220 to 222, appropriately switches the received videos, and outputs the videos to a live distribution device and a recording apparatus, which are not illustrated, in subsequent stage. Further, the PTZ cameras 220 to 222 are connected to the switcher 281 by serial cables 260 to 263 in a daisy chain method. The serial communication units 180 of the PTZ cameras 220 to 222 perform communication of the control information and the like via the serial cables 260 to 263 under control of the CPU 101.

The remote controller operator 270 who operates the infrared remote controller 271 is at a position at which they can check the monitors 230 to 232 for checking the videos in the studio 200. The remote controller operator 270 operates the infrared remote controller 271 to transmit a control command for controlling adjustment of the angle of view and the imaging condition to the PTZ cameras 220 to 222. The infrared reception units 181 of the PTZ cameras 220 to 222 receive the control command from the infrared remote controller 271. The infrared remote controller 271 is an example of an external device.

A switcher operator 280 who operates the switcher 281 while watching a multi-screen monitor 282 is in the sub control room 210. The switcher 281 is connected to the multi-screen monitor 282 by an SDI cable 283. The videos from the PTZ cameras 220 to 222 are displayed on the multi-screen monitor 282 in a state of being able to know which videos from the PTZ cameras 220 to 222 are used for distribution and recording. The PTZ camera that is to be used for video distribution or recording and/or the PTZ camera that is used for a preview (also referred to as standby) are/or selected from among the PTZ cameras 220 to 222 by an operation of the switcher operator 280. If the PTZ camera(s) is(are) selected, the switcher 281 transmits a tally lamp control command to the selected PTZ camera(s) via the serial cables 260 to 263. Specifically, the switcher 281 transmits a command for lighting a red tally lamp to the PTZ camera which is used for video distribution or recording, a command for lighting a green tally lamp to the PTZ camera which is used for the preview, and a command for turning off the tally lamp to the PTZ camera which is not selected. If the serial communication units 180 of the PTZ cameras 220 to 222 receive the tally lamp control commands from the switcher 281, the CPUs 101 control turning on and off of the LED (the tally lamp) 171 according to the received tally lamp control commands. In other words, a lighting state (e.g., ON or OFF) of the tally lamp reflects whether the video is being distributed or not. The ON or OFF of the lighting state of the tally lamp is an example of state information regarding the distribution state.

Figure 3:
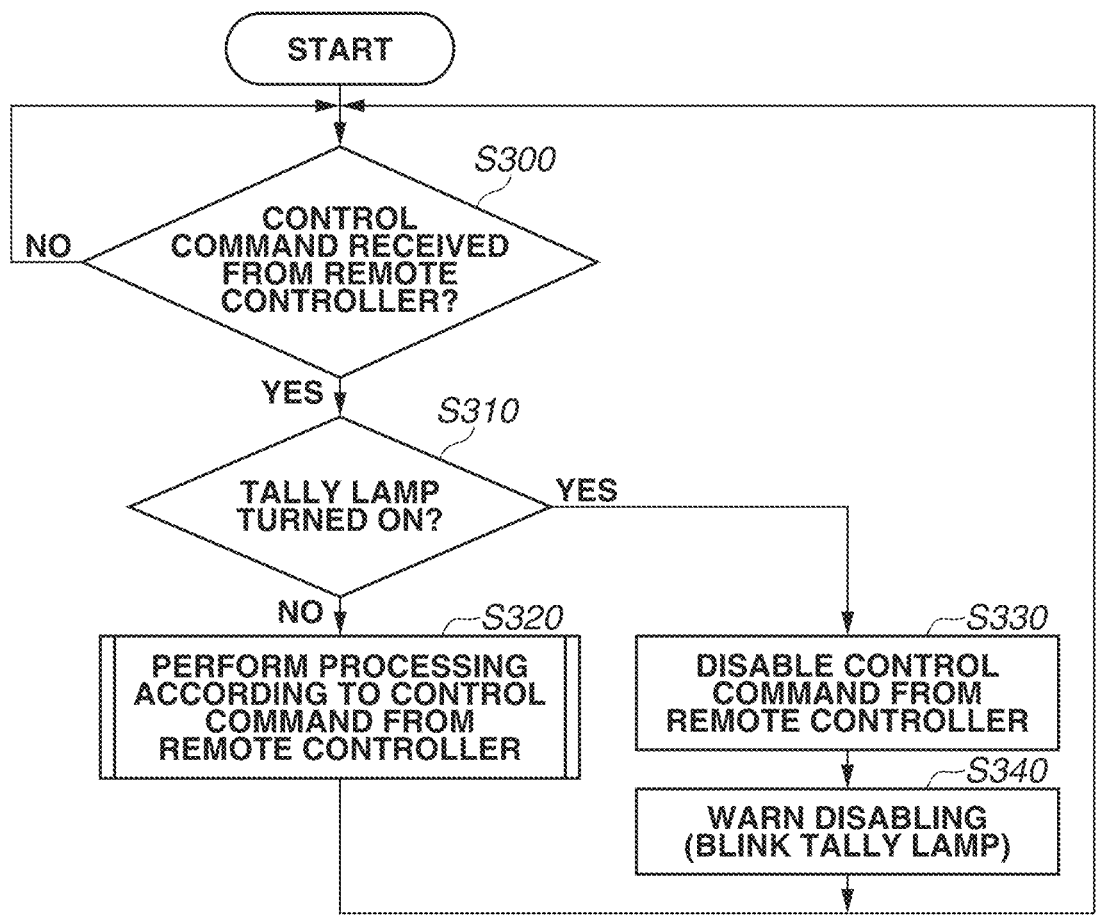
FIG. 3 is a flowchart illustrating a control process of the video distribution apparatus according to one or more aspects of the present disclosure.

FIG. 3 is a flowchart illustrating a control process of the video distribution apparatus 100. Processing in the flowchart illustrated in FIG. 3 is realized by the CPU 101 which loads a program stored in the ROM 102 to the RAM 103 and executes the program. The processing in the flowchart illustrated in FIG. 3 is started in a case where the distribution system is set up as illustrated in FIG. 2. According to the present flowchart, the CPU 101 functions as a reception unit, an acquisition unit, and a control unit. In step S300, the CPU 101 stands by until the infrared reception unit 181 receives a control command transmitted from the infrared remote controller 271. In a case where the CPU 101 determines that the control command is received from the infrared remote controller 271 (YES in step S300), the processing proceeds to step S310. In step S310, the CPU 101 acquires the lighting state of the LED (the tally lamp) 171 and determines whether the LED (the tally lamp) 171 is turned on. In a case where the CPU 101 determines that the lighting state of the LED (the tally lamp) 171 is an OFF state (NO in step S310), the processing proceeds to step S320 to perform processing on the control command from the infrared remote controller 271. In step S320, the CPU 101 performs processing according to the control command from the infrared remote controller 271. The processing then returns to step S300.

In step S310, in a case where the CPU 101 determines that the lighting state of the LED (the tally lamp) 171 is an ON state (a predetermined state) (YES in step S310), the processing proceeds to step S330. In step S330, the CPU 101 disables the control command from the infrared remote controller 271. In other words, the CPU 101 performs control not to perform processing according to the control command. In step S340, the CPU 101 blinks the LED (the tally lamp) 171 to warn that the control command is disabled. In this case, the lamp arranged at the position easily visible from the remote controller operator 270 is blinked, and the lamp arranged at the position which is easily perceivable from the object side remains lit. According to the present exemplary embodiment, the LED (the tally lamp) 171 is blinked to warn that the control command is disabled. However, a method for issuing a warning may be other methods, such as blinking the monitors 230 to 232 for checking the videos. The processing then returns to step S300.

In the above-described flowchart, in a case where the control command is received in step S300, it is determined whether the lighting state of the LED (the tally lamp) 171 is ON or OFF, but the determination method is not limited to this. As another method, in a case where the LED (the tally lamp) 171 is changed from the OFF state to the ON state, the CPU 101 may perform control so as not to receive the control command from the infrared remote controller 271. In this case, in response to a change of the LED (the tally lamp) 171 from the ON state to the OFF state, the CPU 101 receives the control command from the infrared remote controller 271.

According to the above-described first exemplary embodiment, in a case where the remote controller operator 270 performs control to change the angle of view of the PTZ cameras 220 to 222 and the like with the infrared remote controller 271, the control from the infrared remote controller 271 can be disabled if the video is being distributed by the switcher 281. This prevents distribution of a video not intended to be distributed by the switcher operator 280 with an erroneous operation and the like by the remote controller operator 270.

Figure 4:
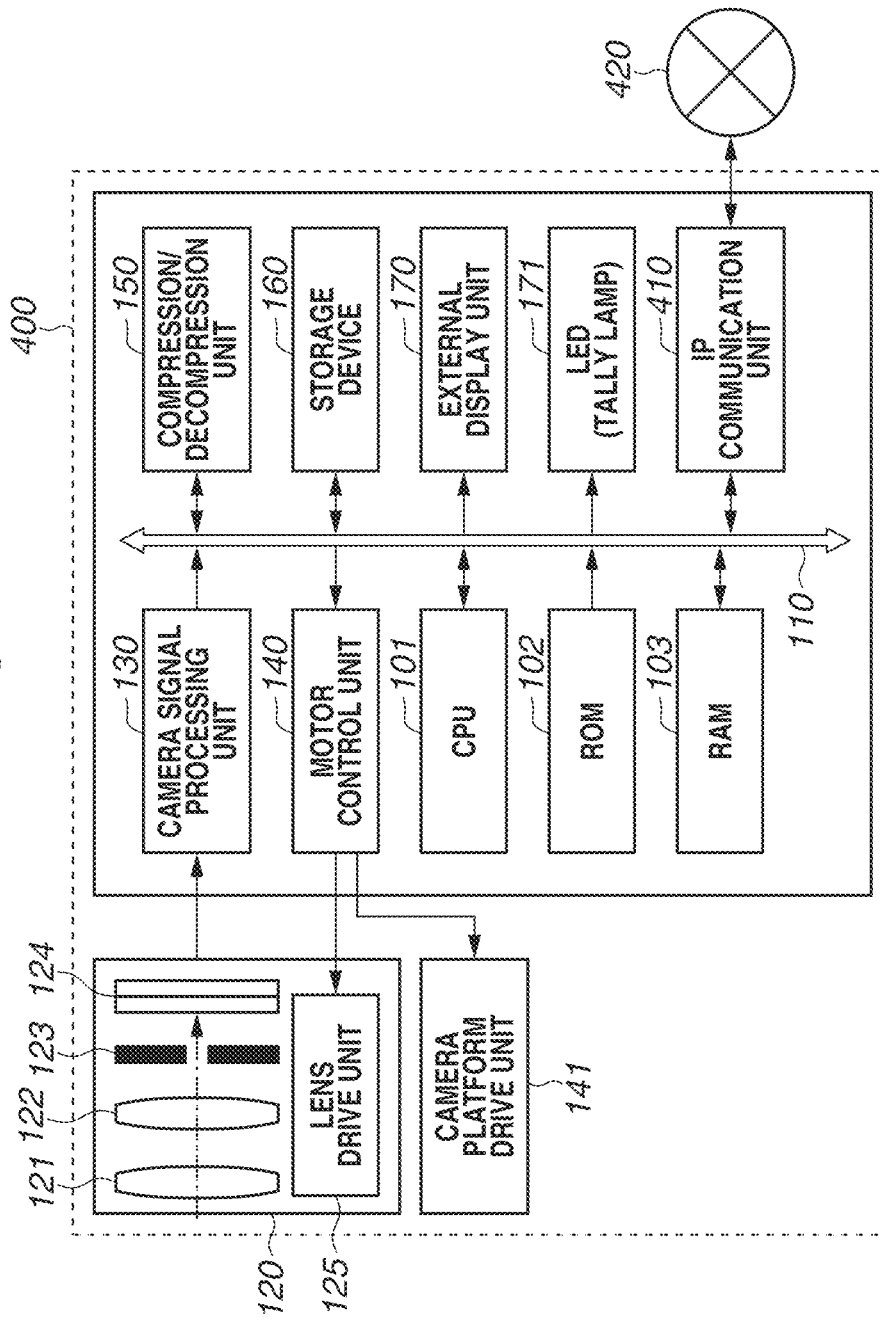
FIG. 4 illustrates an example of a configuration of a video distribution apparatus according to one or more aspects of the present disclosure.

A second exemplary embodiment of the present disclosure will be described below. A video distribution apparatus according to the second exemplary embodiment will be described below with reference to FIGS. 4 to 10. According to the first exemplary embodiment, the video distribution apparatus 100 is controlled over infrared communication. The second exemplary embodiment is different from the first exemplary embodiment in that a video distribution apparatus 400 is controlled over wireless local area network (LAN) communication instead of infrared communication. FIG. 4 is a schematic diagram illustrating a configuration of the video distribution apparatus 400 according to the second exemplary embodiment. FIG. 4 corresponds to FIG. 1 in the first exemplary embodiment, so that only differences between FIGS. 1 and 4 will be described, and other descriptions are omitted. In the video distribution apparatus 400 in FIG. 4, the serial communication unit 180 and the infrared reception unit 181 in FIG. 1 are replaced with an internet protocol (IP) communication unit 410. The IP communication unit 410 is an interface for communicating with the external apparatus by connecting to a network 420 via a wireless or wired LAN. The video distribution apparatus 400 uses the IP communication unit 410 to perform communication of a control command and the like with the switcher 281 and a remote controller (e.g., a Wireless Fidelity (Wi-Fi) remote controller 571 in FIG. 5). Further, the video distribution apparatus 400 uses the IP communication unit 410 to transmit a video captured by the image capturing unit 120 and stored in the RAM 103 to the switcher 281 and the remote controller (the Wi-Fi remote controller 571). The video distribution apparatus 400 in FIG. 4 is capable of transmitting a video to the outside using the IP communication unit 410 and thus may not be provided with the external display unit 170 in FIG. 1.

Figure 5:
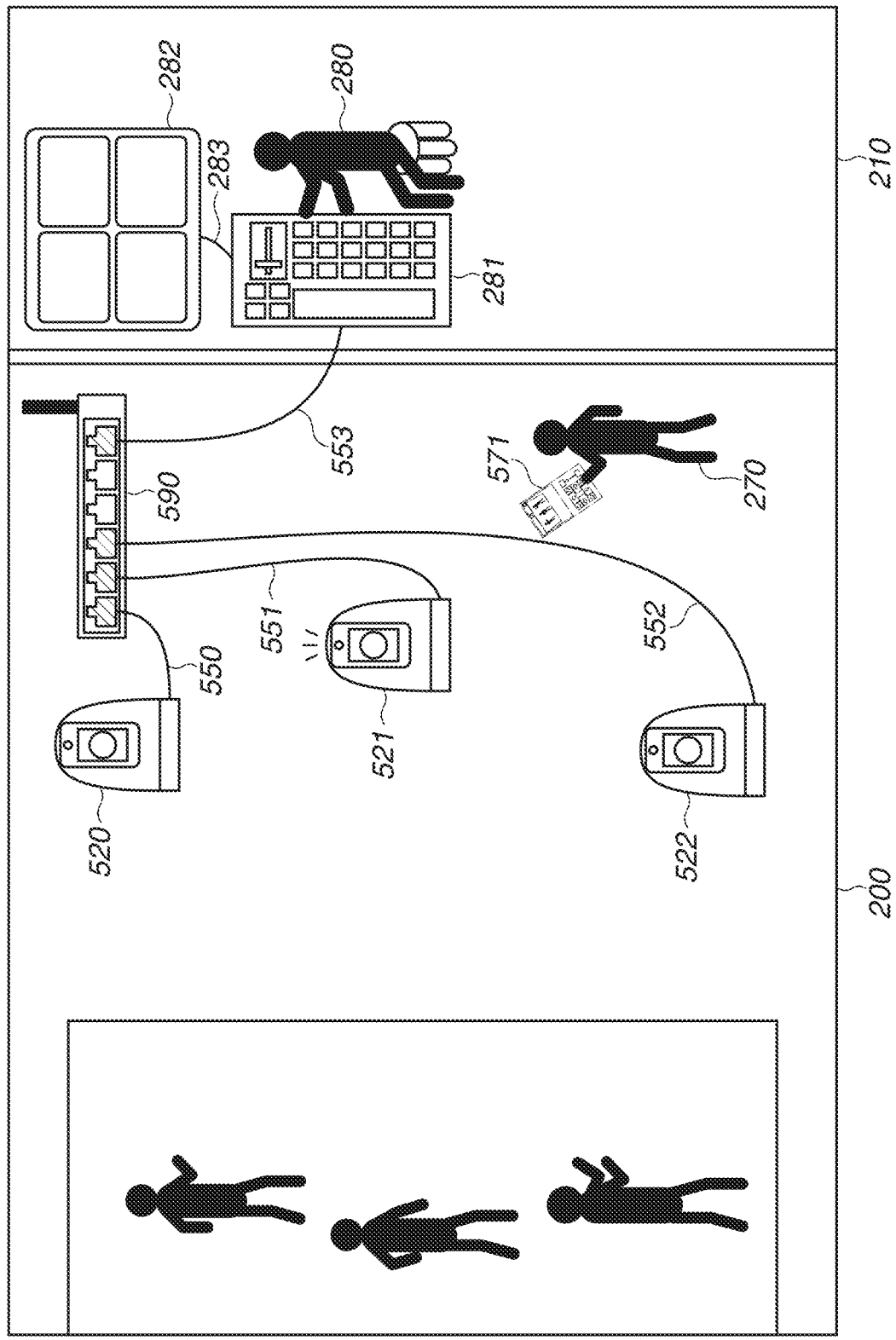
FIG. 5 illustrates an example of an entire configuration of a distribution system according to one or more aspects of the present disclosure.

FIG. 5 illustrates an example of the entire configuration of a distribution system including the video distribution apparatus 400 according to the present exemplary embodiment. FIG. 5 corresponds to FIG. 2 in the first exemplary embodiment, so that only differences between FIGS. 2 and 5 will be described, and other descriptions are omitted. The video distribution apparatus 400 in FIG. 4 is built in each of PTZ cameras 520 to 522 in FIG. 5. A Wi-Fi router 590 is installed in the studio 200 in FIG. 5. The Wi-Fi router 590 is an access point of the wireless LAN and is connected to the network 420. The Wi-Fi router 590 includes a plurality of LAN ports. The Wi-Fi router 590 and the PTZ cameras 520 to 522 are respectively connected by LAN cables 550 to 552. Further, the Wi-Fi router 590 and the switcher 281 are connected by a LAN cable 553. The IP communication units 410 of the PTZ cameras 520 to 522 receive the control information from the switcher 281 via the Wi-Fi router 590 under control of the CPU 101.

The remote controller operator 270 operates the Wi-Fi remote controller 571 instead of the infrared remote controller 271 in FIG. 2. The Wi-Fi remote controller 571 can communicate with the PTZ cameras 520 to 522 via the Wi-Fi router 590 using the wireless LAN such as Wi-Fi. The videos of the PTZ cameras 520 to 522 are displayed on the Wi-Fi remote controller 571, and thus the remote controller operator 270 can operate the Wi-Fi remote controller 571 while viewing the videos of the PTZ cameras 520 to 522 to which a control instruction is issued. The operation of the remote controller operator 270 on the Wi-Fi remote controller 571 transmits a control command for controlling adjustment of an angle of view and/or an imaging condition for the PTZ cameras 520 to 522 via the Wi-Fi router 590. The IP communication units 410 of the PTZ cameras 520 to 522 receive the control command from the Wi-Fi remote controller 571 via the Wi-Fi router 590. The Wi-Fi remote controller 571 is an example of an external device.

The present exemplary embodiment does not need the serial cables 260 to 263, the HDMI (registered trademark) cables 240 to 242, the SDI cables 250 to 252, and the monitors 230 to 232 for checking the videos illustrated in FIG. 2. The videos displayed on the monitors 230 to 232 of the PTZ cameras 520 to 522, respectively, are transmitted from the PTZ cameras 520 to 522 to the Wi-Fi remote controller 571 via the Wi-Fi router 590 and displayed on the Wi-Fi remote controller 571. Further, the videos are transmitted from the PTZ cameras 520 to 522 to the switcher 281 via the Wi-Fi router 590 and displayed on the multi-screen monitor 282.

Figure 6:
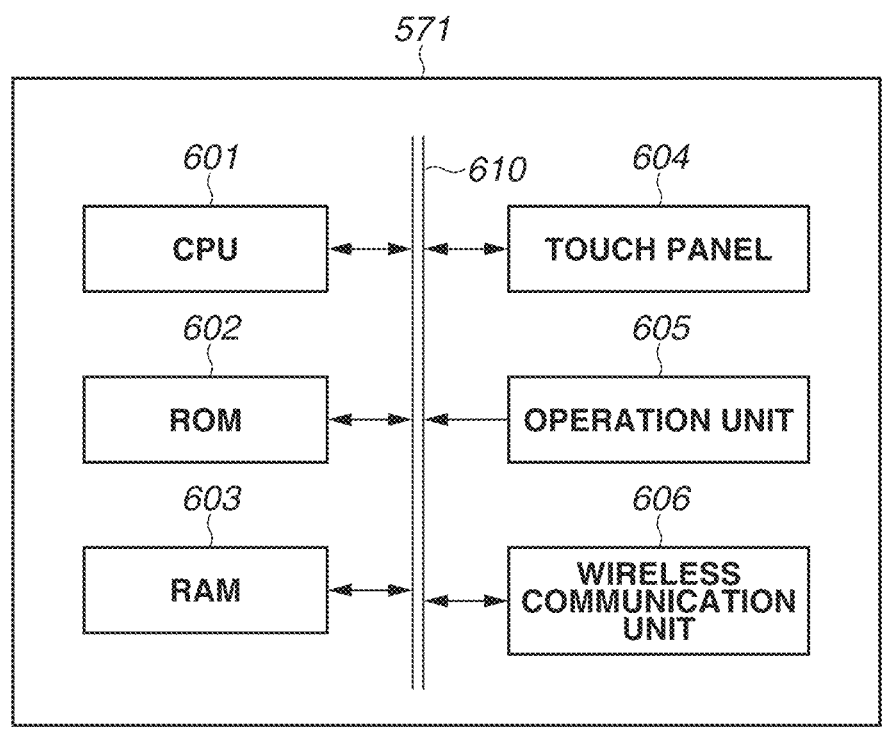
FIG. 6 illustrates an example of a configuration of a Wireless Fidelity (Wi-Fi) remote controller.

FIG. 6 is a schematic diagram illustrating a configuration of the Wi-Fi remote controller 571. A CPU 601 controls the entire Wi-Fi remote controller 571. A ROM 602 is a non-volatile memory, such as an EEPROM and a flash memory. A RAM 603 is a volatile memory, such as an SRAM and a DRAM. A program for realizing a function according to the present exemplary embodiment and data used in execution of the program are stored in the ROM 602 and the like. These program and data are appropriately loaded into the RAM 603 via a bus 610 under control of the CPU 601 and executed by the CPU 601.

A touch panel 604 is used to perform a selection operation of the PTZ cameras 520 to 522 and to display the videos of the PTZ cameras 520 to 522. An operation unit 605 is used to perform an operation for changing an imaging direction and/or a zoom factor of the PTZ cameras 520 to 522 selected using the touch panel 604. If the operation unit 605 is operated, the CPU 601 generates a control command corresponding to the operation and transmits the generated control command to the selected PTZ cameras 520 to 522 via a wireless communication unit 606. The wireless communication unit 606 is an interface for communicating with the external apparatus via the Wi-Fi router 590 on the wireless LAN. The Wi-Fi remote controller 571 uses the wireless communication unit 606 to perform communication of the control command and the like with the PTZ cameras 520 to 522. Further, the Wi-Fi remote controller 571 receives the videos from the PTZ cameras 520 to 522 using the wireless communication unit 606 and displays the videos on the touch panel 604.

Figure 7:
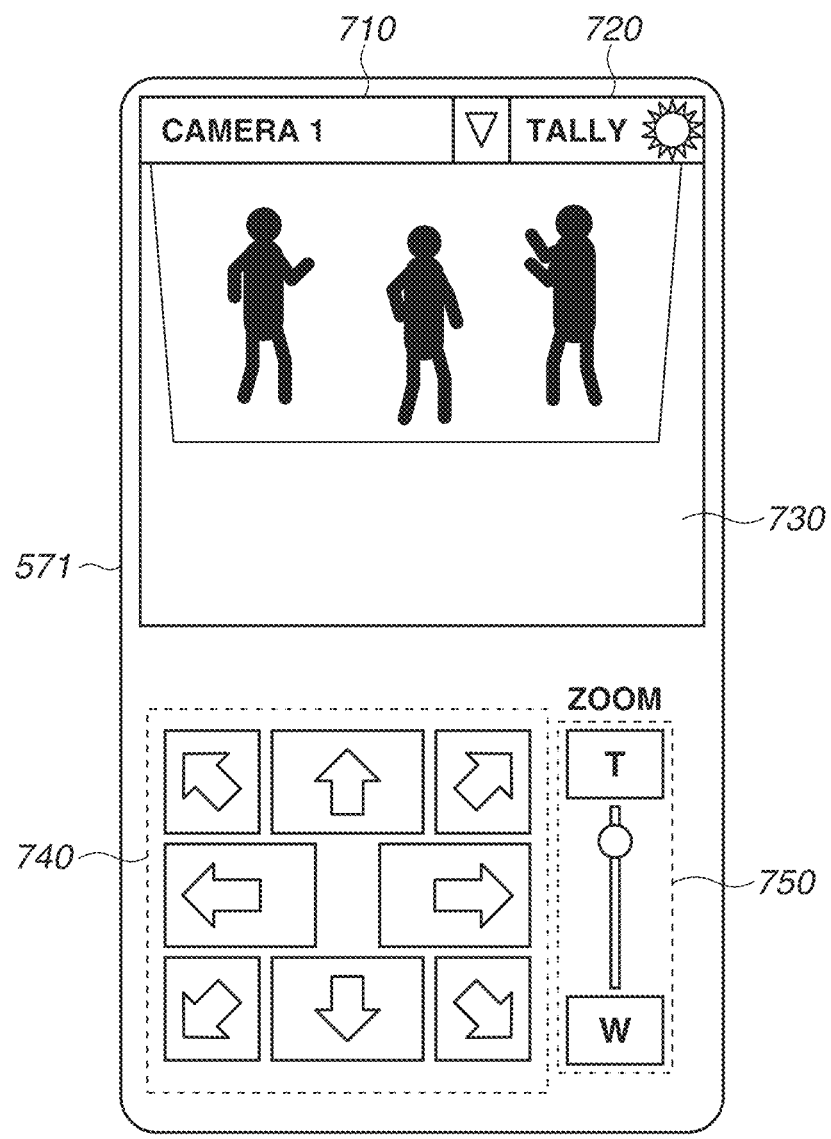
FIG. 7 is an external view of a Wi-Fi remote controller.

FIG. 7 illustrates an example of an external appearance of the Wi-Fi remote controller 571. The touch panel 604 of the Wi-Fi remote controller 571 includes a camera selection area 710, a tally display area 720, and a camera video display area 730. The camera selection area 710 is an area for selecting any one of the PTZ cameras 520 to 522 to which the control instruction is issued. The tally display area 720 is an area for displaying the lighting state of the tally lamp of the selected one of the PTZ cameras 520 to 522. The camera video display area 730 is an area for displaying the video output from the selected one of the PTZ cameras 520 to 522. If the PTZ camera is selected using a pull-down menu in the camera selection area 710, the Wi-Fi remote controller 571 transmits a camera selection command to the selected PTZ camera via the Wi-Fi router 590. The PTZ camera that has received the camera selection command transmits a captured video and the lighting state of the tally lamp to the Wi-Fi remote controller 571 via the Wi-Fi router 590. Upon receiving the video and the lighting state, the Wi-Fi remote controller 571 displays them in the tally display area 720 and the camera video display area 730. The Wi-Fi remote controller 571 may receive a distribution state of the selected PTZ camera from the switcher 281 via the Wi-Fi router 590 and display the received distribution state in the tally display area 720.

The operation unit 605 of the Wi-Fi remote controller 571 includes a direction instruction area 740 for changing the imaging direction and a zoom factor instruction area 750 for changing the zoom factor. If the direction instruction area 740 and the zoom factor instruction area 750 are operated, the Wi-Fi remote controller 571 transmits the control command corresponding to the operation to the one of the PTZ cameras 520 to 522 selected in the camera selection area 710 via the Wi-Fi router 590.

Figure 8:
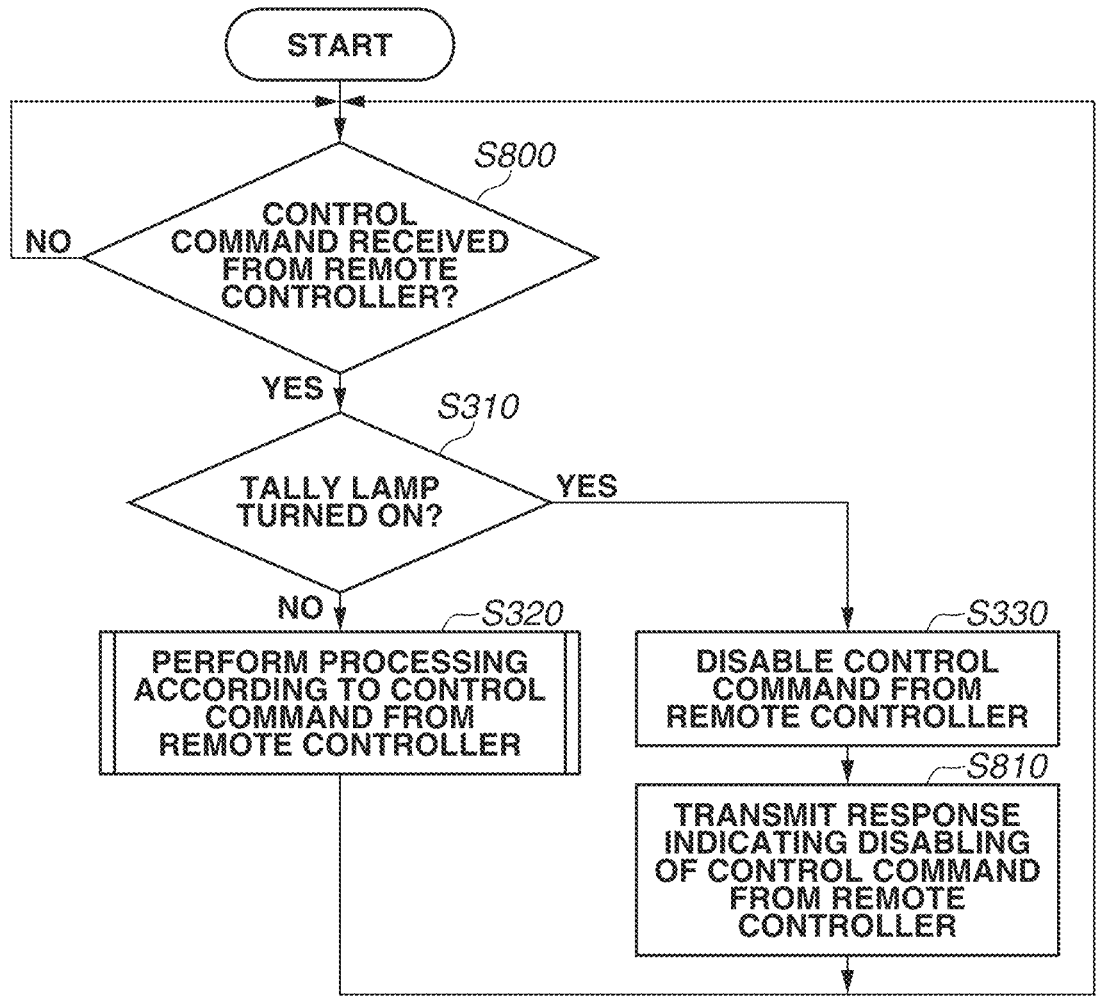
FIG. 8 is a flowchart illustrating a control process of the video distribution apparatus according to one or more aspects of the present disclosure.

FIG. 8 is a flowchart illustrating a control process of the video distribution apparatus 400 and the Wi-Fi remote controller 571. When the flowchart illustrated in FIG. 8 is compared with the flowchart illustrated in FIG. 3, differences are that the steps S300 and S340 are respectively replaced with steps S800 and S810. Thus, steps S800 and S810 will be described, and the other descriptions are omitted. In the present flowchart, the CPU 101 of the video distribution apparatus 400 functions as a reception unit, an acquisition unit, and a control unit.

In step S800, the CPU 101 of the video distribution apparatus 400 stands by until the IP communication unit 410 receives a control command from the Wi-Fi remote controller 571. Unlike the first exemplary embodiment, in the present exemplary embodiment, the control command from the Wi-Fi remote controller 571 and the control command from the switcher 281 are received via the IP communication unit 410. Thus, to identify a transmission source of the control command, a data table as illustrated in FIG. 9 is stored in the ROM 102 of the video distribution apparatus 400. FIG. 9 illustrates a data table indicating the correspondence relation of a type and an IP address of a device which can control the video distribution apparatus 400. The data table includes an IP address of the switcher 281 and an IP address of the Wi-Fi remote controller 571. The CPU 101 of the video distribution apparatus 400 determines whether the control command is transmitted from the Wi-Fi remote controller 571 or the switcher 281 based on the IP address of the transmission source of the control command. In a case where the Wi-Fi remote controller 571 transmits the control command corresponding to the operation of the operation unit 605 to the video distribution apparatus 400, and the CPU 101 of the video distribution apparatus 400 determines that the control command is received from the Wi-Fi remote controller 571 (YES in step S800), the processing proceeds to step S310. In a case where the CPU 101 of the video distribution apparatus 400 determines that the control command is received from the switcher 281 (NO in step S800), the processing may proceed to step S320 regardless of the lighting state of the LED (the tally lamp) 171, regarding the control command as an intentional control instruction of the switcher operator 280.

In step S810, to notify that the control command from the Wi-Fi remote controller 571 is disabled in step S330, the CPU 101 of the video distribution apparatus 400 transmits a response message indicating the disabling of the control command to the Wi-Fi remote controller 571. In response to receiving the response message from the video distribution apparatus 400, the CPU 601 of the Wi-Fi remote controller 571 displays the response message on the touch panel 604. FIG. 10 illustrates a display example of the Wi-Fi remote controller 571 that has received the response message indicating the disabling. As illustrated in FIG. 10, a message display 1000 of "You cannot operate during distribution" is superimposed on the camera video display area 730.

According to the above-described second exemplary embodiment, in a case where the remote controller operator 270 performs control to change the angle of view of the PTZ cameras 520 to 522 using the Wi-Fi remote controller 571, the control from the Wi-Fi remote controller 571 can be disabled if the video is being distributed by the switcher 281. This prevents the distribution of a video which is not intended to be distributed by the switcher operator 280 with an erroneous operation and the like by the remote controller operator 270.

While the present disclosure has been described with reference to exemplary embodiments. However, the exemplary embodiments described above are merely examples for implementing the present disclosure, so that the examples should not be construed restrictively limiting the technical scope of the present disclosure. In other words, the present disclosure can be implemented in the various forms without departing from the technical idea and/or the main features thereof.

The present disclosure can also be realized by executing the following processing. Specifically, a program for realizing one or more functions of the above-described exemplary embodiments is supplied to a system or an apparatus via a network or a storage medium, and one or more processors in a computer of the system or the apparatus reads and executes the program. The processing can also be realized by a circuit (e.g., an application specific integrated circuit (ASIC) realizing one or more functions.

According to each of the above-described exemplary embodiments, in a case where an external device controls an apparatus for video distribution, an occurrence of an unintended operation can be suppressed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-151169, filed Sep. 9, 2020, which is hereby incorporated by reference herein in its entirety.

What is claimed is:

1. An information processing apparatus for distributing a video captured by an image capturing unit, the information processing apparatus comprising:
   at least one processor; and
   a memory coupled to the at least one processor, the memory having instructions that, when executed by the at least one processor, performs operations as:
   a reception unit configured to receive a control instruction related to the image capturing unit from an external device;
   an acquisition unit configured to acquire state information regarding a distribution state of the video captured by the image capturing unit; and
   a control unit configured to reflect the control instruction to the image capturing unit in a case where the state information acquired by the acquisition unit indicates that the video is not being distributed,
   wherein the control unit does not reflect the control instruction to the image capturing unit in a case where the state information acquired by the acquisition unit indicates that the video is being distributed.

2. The information processing apparatus according to claim 1, wherein, in a case where the reception unit receives the control instruction, the control unit determines whether the state information indicates that the video is being distributed.

3. The information processing apparatus according to claim 1, wherein, in a case where the state information indicates that the video is not being distributed, the control unit performs control to perform processing according to the control instruction.

4. The information processing apparatus according to claim 1, wherein the control unit performs control so as not to receive the control instruction in response to the distribution state being changed from a state where the video is being distributed to a state where the video is not distributed and performs control to receive the control instruction in response to the state indicated by the state information being changed to a state different from a predetermined state.

5. The information processing apparatus according to claim 1, wherein, in a case where the control instruction is not reflected, the control unit performs processing of issuing a warning.

6. The information processing apparatus according to claim 1, wherein the acquisition unit receives the video from each of a plurality of the information processing apparatuses and acquires the state information from the external device that distributes a plurality of the videos while switching the videos.

7. The information processing apparatus according to claim 1, further comprising a tally lamp configured to change a lighting state in response to the distribution state of the video, wherein the acquisition unit acquires the lighting state as the state information.

8. The information processing apparatus according to claim 1, wherein the control instruction is an instruction regarding an imaging direction and/or a zoom factor of the image capturing unit.

9. The information processing apparatus according to claim 1, wherein the external device is an infrared remote controller.

10. The information processing apparatus according to claim 1, wherein the external device is connected to the information processing apparatus over wireless local area network (LAN) communication.

11. The information processing apparatus according to claim 10, wherein, in a case where the control unit does not perform the processing according to the control instruction, the control unit transmits a warning to the external device.

12. A system in which an information processing apparatus for distributing a video captured by an image capturing unit and an external device that issues a control instruction to the information processing apparatus are communicable with each other,
wherein the information processing apparatus comprises:
a reception unit configured to receive a control instruction related to the image capturing unit from an external device;
an acquisition unit configured to acquire state information regarding a distribution state of the video captured by the image capturing unit; and
a control unit configured to reflect the control instruction to the image capturing unit in a case where the state information acquired by the acquisition unit indicates that the video is not being distributed,
wherein the control unit does not reflect the control instruction to the image capturing unit in a case where the state information acquired by the acquisition unit indicates that the video is being distributed.

13. A method for controlling an information processing apparatus for distributing a video captured by an image capturing unit, the method comprising:
receiving a control instruction related to the image capturing unit from an external device;
acquiring state information regarding a distribution state of the video captured by the image capturing unit; and
reflecting the control instruction to the image capturing unit in a case where the acquired state information indicates that the video is not being distributed,
wherein the control instruction to the image capturing unit does not reflect in a case where the state information acquired indicates that the video is being distributed.

14. A non-transitory computer-readable storage medium storing computer executable instructions for causing a computer to execute a method comprising:
receiving a control instruction related to the image capturing unit from an external device;
acquiring state information regarding a distribution state of the video captured by the image capturing unit; and
reflecting the control instruction to the image capturing unit in a case where the acquired state information indicates that the video is not being distributed,
wherein the control instruction to the image capturing unit does not reflect in a case where the state information acquired indicates that the video is being distributed-predetermined state.

* * * * *